United States Patent [19]
Diggs

[11] 3,966,604
[45] June 29, 1976

[54] APPARATUS FOR AEROBIC DECOMPOSITION OF SEWAGE

[76] Inventor: Richard E. Diggs, 12 A Road, Carthage, Mo. 64836

[22] Filed: Mar. 25, 1975

[21] Appl. No.: 561,877

[52] U.S. Cl.............................. 210/104; 210/151; 210/197; 210/220
[51] Int. Cl.²...................................... B01D 21/24
[58] Field of Search .......... 210/150, 151, 197, 220, 210/104; 261/92

[56] References Cited
UNITED STATES PATENTS

| | | | |
|---|---|---|---|
| 3,117,927 | 1/1964 | Smith | 210/403 X |
| 3,534,857 | 10/1970 | Beak | 210/151 |
| 3,558,255 | 1/1971 | Rose | 210/197 X |
| 3,733,264 | 5/1973 | Spector et al. | 210/220 X |
| 3,764,011 | 10/1973 | Owens | 210/197 X |
| 3,886,074 | 5/1975 | Prosser | 210/150 |

Primary Examiner—John Adee
Attorney, Agent, or Firm—Shoemaker and Mattare, Ltd.

[57] ABSTRACT

An apparatus for the aerobic, sludge-free decompositon of sewage and the like, includes a plurality of separate, liquid filled compartments, one of the compartments having a rotatable, air-operated, horizontally disposed perforated drum therein in which raw sewage is placed. Air inlets are at the bottom of the compartment, and air bubbles flowing upwardly therefrom cause the drum to rotate, to thus break up and fragment the raw sewage therein until the particles thereof are of a size such as to pass through the perforated wall of the drum into the compartment. The fragmented sewage is further agitated in the compartment and thoroughly aerated, whereby aerobic decomposition thereof rapidly takes place. The material is then passed sequentially through all of the compartments and recycled as necessary, until substantially complete liquification and decomposition thereof is accomplished.

15 Claims, 5 Drawing Figures

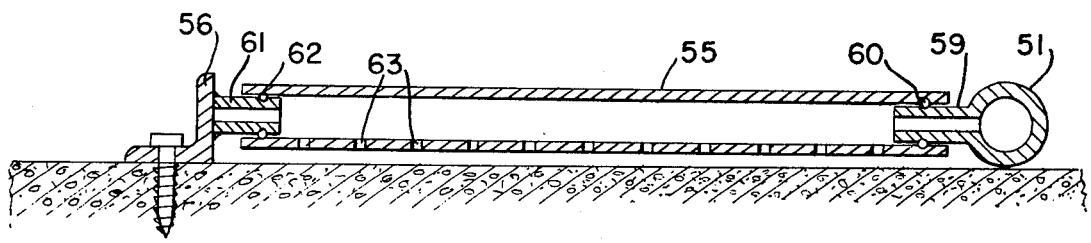
FIG.3.
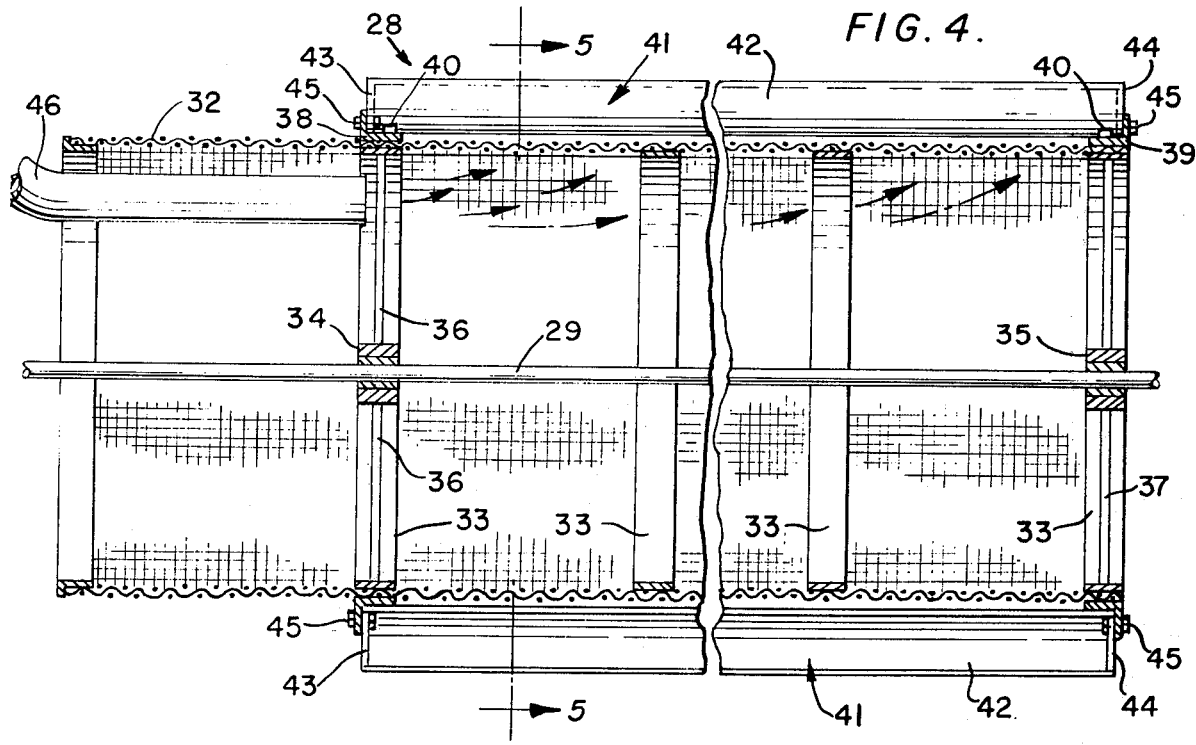
FIG.4.
FIG.5.
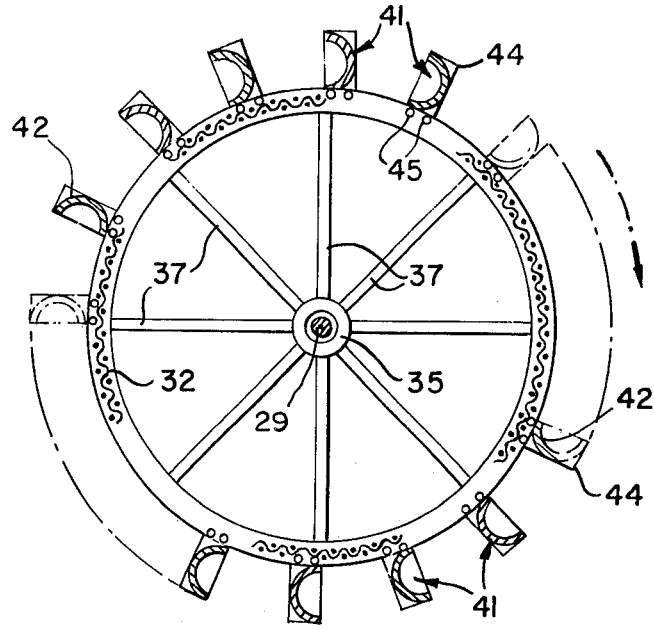

APPARATUS FOR AEROBIC DECOMPOSITION OF SEWAGE

BACKGROUND OF THE INVENTION

This invention relates to an apparatus for the treatment of sewage, and in particular, relates to such an apparatus which reduces or decomposes raw sewage into a harmless effluent, which is suitable for use in irrigation or other non-potable uses.

Specifically, the present invention relates to an apparatus for the aerobic decomposition of sewage and the like wherein raw sewage is introduced into a series of compartments and air is introduced thereinto, whereby aerobic bacteria act on the raw sewage to decompose the sewage and break it down into a substantially completely liquified odorless and sludge-free effluent, which can then be pumped either to a disposal field or which can be used to irrigate crops, lawns, gardens and the like, as desired. In fact, the effluent can even be recycled for non-potable uses.

One or more sewage decomposing units according to the invention can be provided, and in smaller or larger sizes, as necessary, in order to efficiently decompose the sewage from a single small source, such as a mobile home or the like, or from a large city. The apparatus according to the invention is smaller and less expensive than conventional sewage treatment facilities, and does not require as extensive or ideally situated disposal field as conventional sewage treatment facilities, and in fact, with the present invention there is no problem with sewage sludge as there is with prior art systems, and the present apparatus costs only one-fifth as much as conventional systems, and the effluent generated thereby is odorless and can be used for irrigation or other useful purposes, and thus the effluent from the apparatus of the invention is a useful asset rather than an expensive liability.

The effluent from the apparatus of the invention meets all Environmental Protection Agency standards for effluent, and the effluent is non-settling, is totally liquified and is odor free, and is useful to water and fertilize plants. The substantially complete liquification of the effluent and the elimination of sludge is one of the most important features of the present invention, and this result is apparently accomplished because of the recycling of all of the precipitates which settle out of the effluent during its processing through the various stages of the apparatus, and the use of the perforated drum to break up the incoming raw sewage, so that the aerobic bacteria can attack the sewage much more rapidly. Further, the introduction of air into the bottom of the apparatus, whereby the air bubbles upwardly through the sewage and effluent, and the use of the spinner device in the bottom of the first compartment, all enhance the decomposition of the sewage by the aerobic bacteria and prevent the accumulation of sludge in the various compartments of the apparatus.

OBJECTS OF THE INVENTION

Accordingly, it is an object of this invention to provide an apparatus for the aerobic decomposition of sewage and the like, wherein the sewage is substantially decomposed and liquified and rendered odorless and safe for use to irrigate and fertilize crops and the like.

Another object of the invention is to provide an apparatus for the treatment of sewage, wherein the apparatus eliminates the formation of sewage sludge during the treatment of the sewage.

A further object of the invention is to provide an apparatus for the aerobic decomposition of sewage and the like, wherein the apparatus is substantially more economical and efficient than prior art sewage treatment apparatus.

A still further object of the invention is to provide an apparatus for the treatment of sewage and the like, wherein a horizontally disposed perforated drum is situated to receive raw sewage, and the drum includes a plurality of vanes fixed thereto in position to trap upwardly rising air to effect rotation of the drum to break up the raw sewage contained therein until the particle size thereof is sufficient to fall through the perforations of the drum.

BRIEF DESCRIPTION OF THE DRAWINGS

FIG. 3 is a greatly enlarged sectional view of one of the air discharge pipes and is taken along line 3—3 of FIG. 1.

FIG. 4 is an enlarged sectional view with a portion thereof broken away of the perforated drum used with the apparatus of the invention.

FIG. 5 is a transverse sectional view of the drum of FIG. 4 and is taken along line 5—5 of FIG. 4.

DETAILED DESCRIPTION OF THE INVENTION

Figure 2:
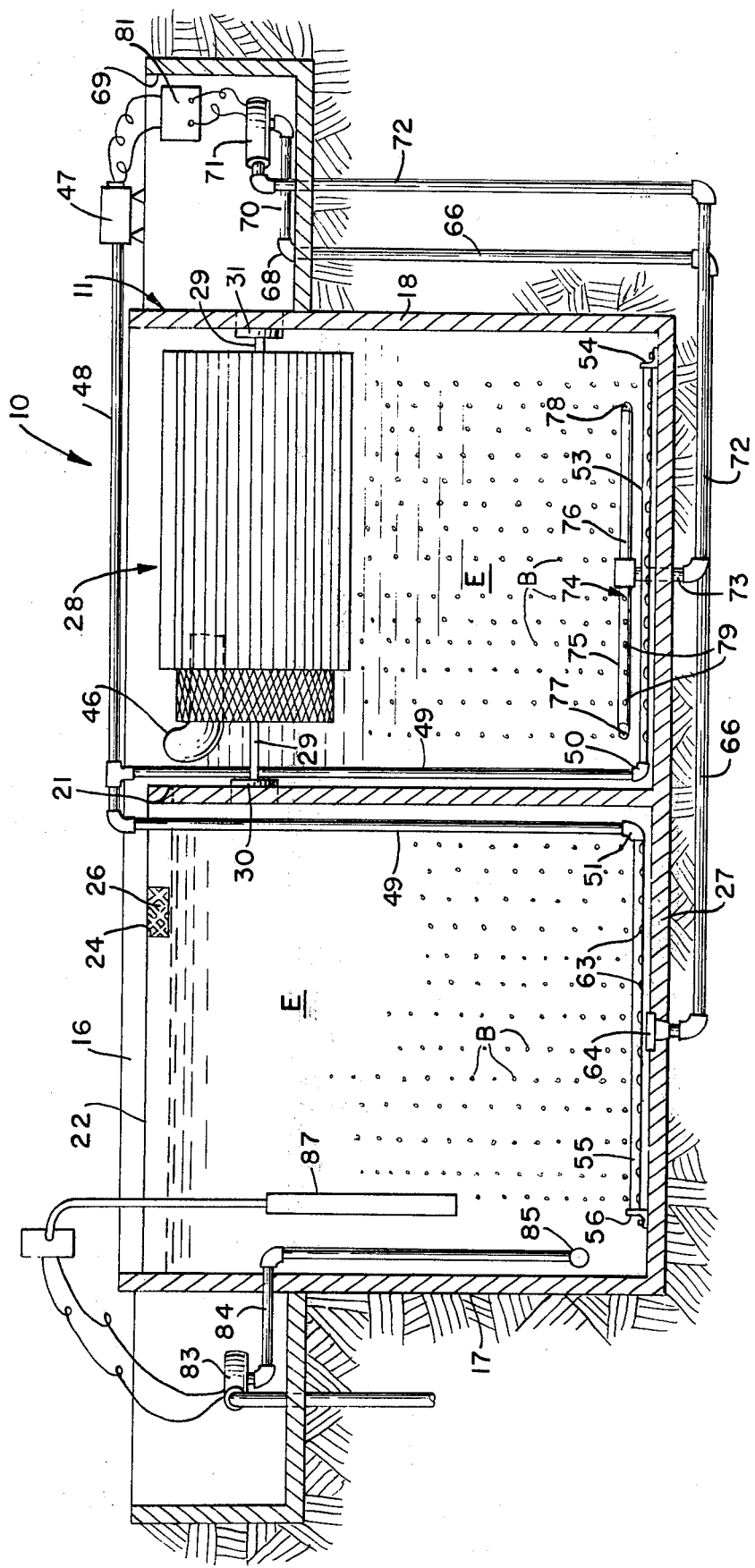
FIG. 2 is a vertical sectional view of the apparatus of FIG. 1 and is taken along line 2—2 of FIG. 1.

In the drawings, wherein like reference numerals indicate like parts throughout the several views, the apparatus for aerobic decomposition of sewage and the like is indicated generally at 10 and comprises a receptacle or container 11 divided into a first stage pit or compartment 12, a second stage pit or compartment 13, and a final compartment or polish pit 14. The container 11 may either be supported above the surface of the ground or disposed within the ground, as desired, and in the particular embodiment described herein, the container comprises cinderblock or cement or the like and is disposed in the ground, as indicated in FIG. 2.

Figure 1:
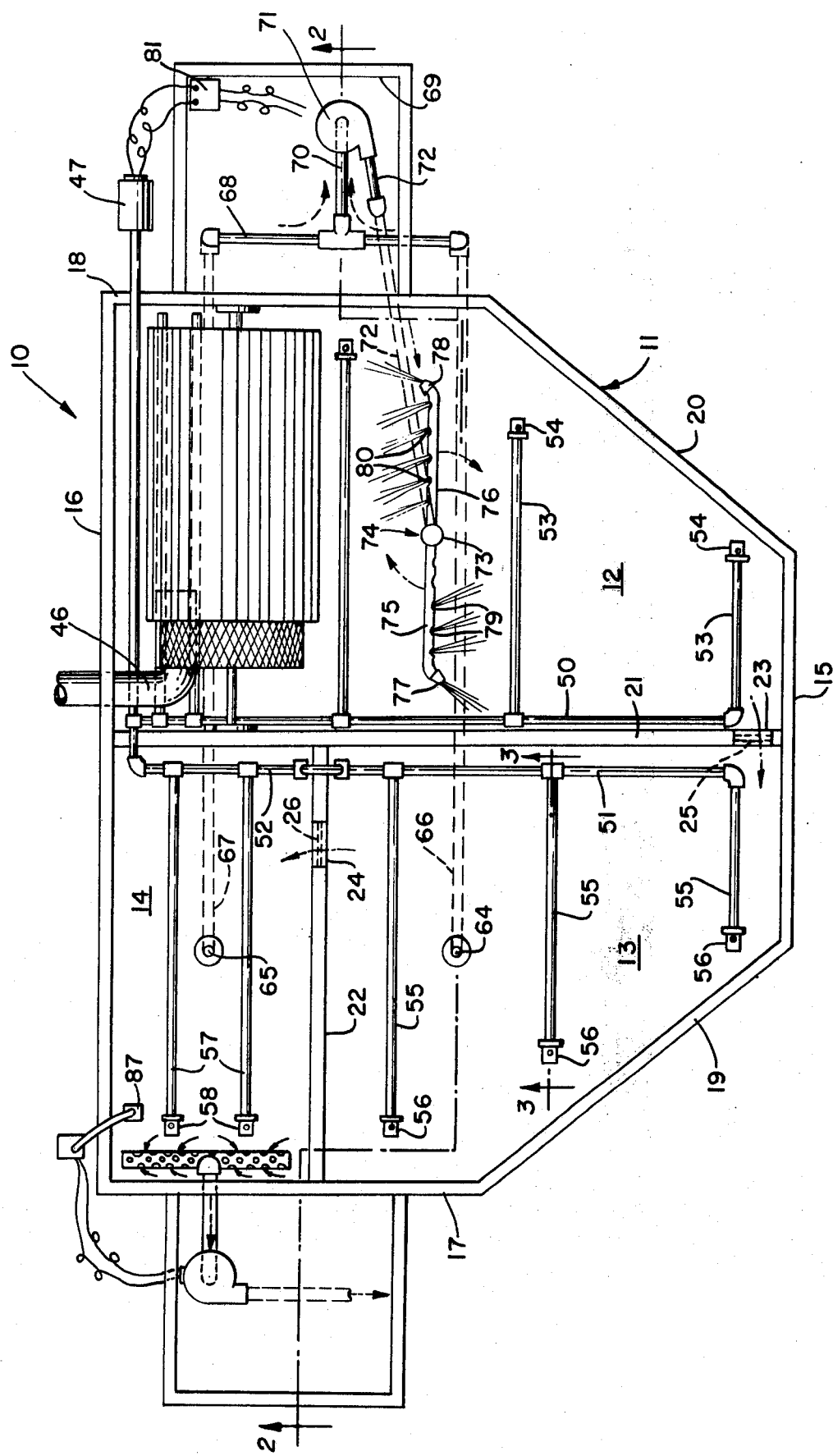
FIG. 1 is a plan view of the apparatus according to the invention.

The receptacle 11 includes spaced apart, parallel, vertically upstanding front and back walls 15 and 16 and spaced apart, parallel, vertically upstanding end walls 17 and 18. The front wall 15 is substantially shorter than the back wall 16, and the end walls 17 and 18 include converging portions 19 and 20 joined to opposite ends of the front wall 15. The interior of the receptacle is divided or separated by a partition or dividing wall 21, which extends between the midpoints of the front and back walls, thus separating the first stage chamber or compartment 12 from the second stage compartment 13 and polish pit or compartment 14. A further dividing wall 22 extends between end wall 17 and the center partition 21 and separates the second stage compartment 13 from the polish compartment 14. The location and relationship of the dividing walls and outer walls of the receptacle are such that the first stage compartment 12 occupies essentially half the volume of the interior of the receptacle, and the second stage compartment 13 occupies approximately two-thirds of the volume of the remaining half of the interior of the receptacle. Thus, the volumetric capacity of the compartments becomes smaller as the effluent progresses therethrough toward the discharge. Additionally, the first stage compartment 12 and second stage compartment 13 are both of reduced volumetric capacity or cross-sectional dimension toward the front wall 15 because of the angularly extending end wall portions 19 and 20, as seen clearly in FIG. 1, for example.

A weir or flowthrough channel 23 is in the upper edge of center dividing wall 21 adjacent the front wall 15 of the receptacle in the narrowed portion of the first and second stage chambers or compartments 12 and 13, whereby when the level of effluent E in compartment 12 reaches the bottom of the weir 23, the effluent flows into second stage compartment 13. Also a weir or flowthrough channel 24 is formed in the partition 22 between second stage compartment 13 and polish compartment 14, whereby when the level of effluent in compartment 13 reaches the bottom of the weir 24, the effluent flows into the polish compartment 14, as indicated by the arrow.

If desired, grates or screens or the like 25 and 26 may be provided in the weirs 23 and 24 to prevent flow of solids from one compartment to the other.

The receptacle 11 also has a substantially flat bottom wall 27 spanning the bottom of all of the compartments 12, 13 and 14.

A horizontally disposed, open-ended, air-operated, perforated sewage fragmenting drum 28 is rotatably supported near the top of first stage compartment 12 adjacent the back wall 16 thereof by means of an axle or shaft 29 extended coaxially through the drum and journalled in bearing means 30 and 31 in the dividing wall 21 and end wall 18, respectively.

As seen best in FIGS. 4 and 5, the drum 28 comprises an elongate wire mesh cylinder 32, supported on a cage comprising a plurality of annular hoops or rings 33 of aluminum or other suitable lightweight material, and including hubs 34 and 35 and radially extending spokes 36 and 37 at the hoops at opposite ends of the drum. A pair of annular, ring-shaped angle members 38 and 39 are secured to the cylinder 32 in concentric relationship with the rings 33 at opposite ends of the drum by means of a plurality of bolts or the like 40 extended through the axially extending flange of the angle members and through the screen and through the hoops 33 at the opposite ends of the drum.

A plurality of longitudinally extending air vanes 41 are secured to the angle members 38 and 39 in parallel, equally spaced relationship around the circumference of the drum, and the vanes 41 comprise elongate, semi-cylindrical members 42, having opposite end plates 43 and 44 suitably secured to opposite ends thereof, and with the end plates 43 and 44 secured to the angle members 38 and 39, respectively, by means of bolts 45 extended therethrough.

In one specific embodiment of the invention, the wire mesh cylinder 32 may have ⅛ inch openings therethrough, and the air vanes 41 may comprise conventional 4 inch diameter aluminum irrigation pipe cut in half longitudinally, and with aluminum plates or brackets 43 and 44 welded or otherwise suitably secured to the opposite ends thereof, to thus define the elongate, trough-shaped vanes 41 for trapping the upwardly rising air bubbles in the use of the drum, to thereby impart rotation to the drum.

A raw sewage feed pipe 46 extends into the throat or one open end of the cylinder 32 for discharge of raw sewage into the interior of the drum. In one specific example of the invention, the pipe 46 may comprise synthetic plastic, as polyvinyl chloride, and may have a diameter of about 6 inches.

Air is supplied to the compartments of the receptacle from a dry vane type airpump 47 or other suitable pump, as desired, and through an air supply pipe 48 to vertically extending branch supply pipes 49 in the three compartments 12, 13 and 14. The vertically extending branch supply pipes 49 are in turn connected with horizontally extending manifold pipes 50, 51 and 52 in the compartments 12, 13 and 14, respectively, extending along the bottom wall 27 of the receptacle adjacent the center dividing wall 21.

A plurality of substantially equally spaced apart air discharge pipes 53 are connected at one end with the manifold pipe 50 in compartment 12 and extend closely adjacent the bottom wall 27 toward, but spaced from, end wall portions 18 and 20, and the other or outer ends of discharge pipes 53 are connected to suitable angle-shaped anchor devices 54 fixed to the ends of discharge pipes 53 and to the bottom wall 27, respectively. Similarly, air discharge pipes 55 are connected at one of their ends to manifold 51 in compartment 13 and extend adjacent the bottom wall 27 and are secured at their other ends to angle-shaped anchor devices 56, which are secured to the other ends of the discharge pipes 55 and to the bottom wall 27, respectively. Similarly, air discharge pipes 57 are secured at one of their ends to the manifold 52 in compartment 14 and are secured at their other ends to angle-shaped anchor devices 58. The construction of the air discharge pipes is seen best in FIG. 3, wherein one of the discharge pipes 55 has its said one end telescopically received over a hollow nipple 59 welded or otherwise suitably affixed to the manifold 51 and extending from the side thereof, and the nipple 59 is sealed relative to the discharge pipe 55 by means of an O-ring or the like 60 interposed therebetween. The anchor device 56 likewise has a laterally extending nipple or projection 61 thereon, received in the other end of the discharge pipe 55 and sealed relative thereto by means of an O-ring or the like 62. The discharge pipe 55 has a plurality of openings 63 drilled or otherwise suitably formed in the underside thereof for flow of air outwardly of the discharge pipe into the effluent E in the respective compartments.

Thus, as seen in FIG. 2, upwardly flowing streams of bubbles B of air are substantially uniformly distributed throughout the effluent in the various compartments of the receptacle.

Drain openings 64 and 65 extend through the bottom wall 27 of the compartments 13 and 14, respectively, and first and second drain pipes 66 and 67 are connected with the drain openings 64 and 65, respectively, and the drain pipes extend to a drain header pipe 68 disposed in a recycle chamber 69 adjacent the end wall 18 of receptacle 11. The drain header 68 is connected through an inlet pipe 70 with a suitable pump means 71, and the pump means 71 is connected with an outlet pipe 72, which extends to the hub 73 of a spinner device 74 disposed in the first stage compartment 12 adjacent the bottom wall 27 thereof and substantially in the center of the bottom wall 27.

The spinner device 74 comprises a pair of oppositely extending pipes 75 and 76 having reaction nozzles 77 and 78 at their outer ends thereof and a plurality of orifices or openings 79 and 80 between the ends thereof, respectively, whereby liquid pumped thereto by the pump 71 is ejected under pressure from the nozzles 77 and 78 and the orifices 79 and 80, to thereby impart rotation to the spinner device 74 and thus impart a stirring or agitating motion to the effluent in the first stage compartment 12.

The air pump 47 and recycle pump 71 are both connected with a timer 81, whereby the pumps 47 and 71 are each energized for operation for one hour and de-energized or inoperative for 6 hours. Moreover, the pumps 47 and 71 operate on opposite cycles, so that they are not both operating at the same time.

A discharge chamber 82 is provided adjacent end wall 17 and a discharge pump 83 is supported therein. The discharge pump 83 is connected via a suction pipe 84, with a suction tube 85 disposed in the polish compartment 14 near the bottom thereof. A discharge pipe 86 is also connected with the pump 83 and extends from the discharge compartment or chamber 82 to a suitable disposal field or point of use of the decomposed effluent.

Operation of the discharge pump 83 is controlled by a liquid level responsive device 87, such that the discharge pump 83 is only operated when the effluent reaches a predetermined level in polish compartment 14.

The suction tube 85 may comprise either a filter screen device or, for example, a piece of 4 inch aluminum tube with a plurality of small holes drilled in it to filter out any solids that may be in the effluent before the effluent is pumped to the disposal field or other point of use.

Thus, in operation, raw sewage is pumped through pipe 46 into the interior of drum 28, and the air pump 47 is energized to create a flow of bubbles B upwardly through liquid contained in the compartments 12, 13 and 14. The rising air bubbles are trapped by the vanes 41 of the drum 28 and cause the drum to rotate, thus tumbling the sewage in the drum and breaking up the sewage into small particles, until it falls through the openings in the mesh of the cylinder 32 of the drum. The fragmented sewage then enters the compartment 12, where it is attacked by aerobic bacteria and quickly decomposed. The rising air bubbles greatly speed up the action of the aerobic bacteria on the sewage, and as the liquid level rises in compartment 12, the partly digested or decomposed effluent flows through weir 23 into compartment 13. Here the rising air bubbles B agitate and further enhance the rapid decomposition of the effluent by aerobic bacteria therein, and as the level rises in compartment 13, the nearly completely digested effluent flows through weir 24 into polish pit or compartment 14, where rising air bubbles continue to speed the action of aerobic bacteria on the effluent, and the completely liquidized and decomposed effluent is then discharged from the receptacle through suction tube 85 and pump 83 to the discharge pipe 86 for transport of the effluent either to a disposal field or to an area to be irrigated or the like, as desired. Any solids which settle out of the effluent in compartments 13 and 14 enter the drains 64 and 65 and are pumped by pump 71 to the discharge pipe 72 and to the spinner 74 in compartment 12 and back into the effluent in the compartment 12 for further aerobic action. Thus, the rotation of the stirrer device 74 in compartment 12 prevents the settling of solids therein and prevents the formation of sludge in this compartment, and any solids which settle in compartments 13 and 14 are pumped back to the first compartment 12 for further action by the aerobic bacteria.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. Apparatus for the aerobic, sludge free decomposition of sewage and the like, comprising: a plurality of separate, liquid-containing compartments; a rotatable, horizontally disposed, hollow drum at least partially immersed in the liquid contained in a first one of the compartments; the drum having sides with a plurality of holes defined therein which form an irregular inner surface on the drum sides, a raw sewage feed pipe having a discharge end located within the interior of the drum to introduce raw sewage and the like into the interior of the drum so that the sewage contacts the irregular inner surface of the drum sides to be agitated thereby; air inlet means at the bottom of said first compartment to indroduce air thereinto and thus effect upward bubbling of the air through the liquid in the first compartment; bubble trapping means connected with the drum and arranged to trap at least some of said bubbles and effect rotation of the drum, said drum rotating at a speed such that the raw sewage contacting the irregular inner surface of the drum sides is sufficiently agitated to be fragmented into particles small enough to pass through the holes in the drum wall and into the first compartment; the air inlet means being arranged in the first compartment to introduce bubbles thereinto in a direction so that at least some of the bubbles contact fragmented particles to agitate and aerate the fragmented particles flowing into that first compartment from the rotating drum to enhance aerobic decomposition thereof; and flow control means operatively associated with the compartments to effect the sequential flow of the material through all of the compartments and to effect recycling of the heavier particles thereof, until substantially complete liquification and decomposition of the material is obtained.

2. Apparatus as in claim 1, wherein the compartments are arranged in side-by-side relationship and are separated by dividing wall means and include at least a first compartment and a last compartment, said drum submerged in the liquid in the first compartment.

3. Apparatus as in claim 2, wherein the air inlet means comprises an air inlet manifold pipe in each compartment connected with a source of air under pressure, and a plurality of air discharge pipes connected with the manifold pipe and extending within the compartments adjacent the bottom thereof in substantially equally spaced relation across the bottom of the compartment.

4. Apparatus as in claim 3, wherein a spinner device is in said first compartment at the bottom thereof to agitate and stir the material in the first compartment.

5. Apparatus as in claim 4, wherein the flow control means includes weir means to control flow from the first to the last compartment, and recycling means including a drain in the bottom of the last compartment, a conduit connected with the drain and with the spinner device, a recycling pump connected in the conduit to pump undigested material drained from the last compartment back to the first compartment to again subject it to aerobic action, the spinner device including a pair of discharge nozzles through which the material is pumped under pressure to cause the spinner device to spin.

6. Apparatus as in claim 5, wherein there are three compartments, including a first stage compartment, a second stage compartment, and a third stage compartment, and drain means connected with the second stage compartment and the pump means to recycle material drained from the second stage compartment back to the first stage compartment.

7. Apparatus as in claim 6, wherein a digested effluent discharge means is connected with the third stage compartment to remove digested effluent therefrom, said discharge means including a strainer to filter solid particles from the discharged effluent.

8. Apparatus as in claim 7, wherein timer means is connected with the air supply means and with the recycling pump means to cyclically effect operation of the air supply means for 1 hour and deactivation thereof for 6 hours, and alternately therewith to effect operation of the air supply means for 1 hour and deactivation thereof for 6 hours.

9. Apparatus as in claim 8, wherein operation of the discharge means is controlled in response to a liquid level means in the third stage compartment.

10. Apparatus as in claim 1, wherein the drum is rotatably supported on a horizontally disposed axis, said drum comprising a wire mesh, open-ended cylinder, and said air operated means comprises a plurality of longitudinally extending vanes fastened to the outer surface of the cylinder.

11. Apparatus as in claim 10, wherein a raw sewage supply pipe extends into one of the open ends of the cylinder for introduction of raw sewage into the cylinder.

12. Apparatus as in claim 11, wherein the screen is ⅛ inch wire mesh, and the air inlet means comprises a manifold pipe in each compartment near the bottom thereof and connected with a source of air under pressure, and a plurality of air discharge pipes connected with each manifold pipe and extending in spaced apart relationship over the bottom of each compartment, said air discharge pipes having a plurality of air outlet holes in the underside thereof.

13. Apparatus as in claim 12, wherein the vanes each comprise an elongate, substantially semicylindrical, inverted member with end plates fixed to opposite ends thereof to define elongate pockets to trap the air bubbles and thus impart rotation to the drum.

14. Apparatus as in claim 13, wherein the compartments comprise walled pits and include a first stage pit, a second stage pit and a polish pit, a hydraulically operated spinner device in the first stage pit, drain means in the bottom of each of the second stage pit and the polish pit to drain settled solids from the pits, conduit means connected between the drain means and the spinner device, and selectively operable effluent recycle pump means connected in the conduit means to recycle undigested, settled effluent from the second stage pit and polish pit back to the first stage pit through the spinner device to obtain substantially complete digestion and liquification of the effluent prior to discharge of the effluent from the polish pit.

15. Apparatus for the aerobic, sludge free decomposition of sewage and the like, comprising: a plurality of separate, liquid-containing compartments; a rotatable, horizontally disposed hollow drum at least partially immersed in the liquid contained in a first one of the compartments; the drum having sides with a plurality of holes defined therein which form an irregular inner surface on the drum sides, a raw sewage feed pipe having a discharge end located within the interior of the drum to introduce raw sewage and the like into the interior of the drum so that the sewage contacts the irregular inner surface of the drum sides to be agitated thereby; air inlet means at the bottom of said first compartment to introduce air thereinto and thus effect upward bubbling of the air through the liquid in the first compartment; bubble trapping means connected with the drum and arranged to trap at least some of said bubbles and effect rotation of the drum, said drum rotating at a speed such that the raw sewage contacting the irregular inner surface of the drum sides is sufficiently agitated to be fragmented into particles small enough to pass through the holes in the drum wall and into the first compartment; the air inlet means being arranged in the first compartment to introduce bubbles thereinto in a direction so that at least some of the bubbles contact fragmented particles to agitate and aerate the fragmented particles flowing into that first compartment from the rotating drum to enhance aerobic decomposition thereof; and flow control means operatively associated with the compartments to effect the sequential flow of the material through all of the compartments, and means to effect recycling of the heavier particles thereof including discharge means rotatably mounted in the first compartment to discharge the heavier particles into the first compartment, and means for rotating the discharge means, said recycling operation being continued by said flow control means until substantially complete liquification and decomposition of the material is obtained.

* * * * *